(12) United States Patent
Heggebø et al.

(10) Patent No.: US 12,528,646 B2
(45) Date of Patent: Jan. 20, 2026

(54) GRID SURVEY MODULE

(71) Applicant: Autostore Technology AS, Nedre Vats (NO)

(72) Inventors: Jørgen Djuve Heggebø, Langhus (NO); Ole Alexander Mæhle, Etne (NO); Vemund Rogne, Trondheim (NO); Jonathan Eide, Stavanger (NO)

(73) Assignee: AutoStore Technology AS, Nedre Vats (NO)

( * ) Notice: Subject to any disclaimer, the term of this patent is extended or adjusted under 35 U.S.C. 154(b) by 360 days.

(21) Appl. No.: 18/263,615

(22) PCT Filed: Feb. 4, 2022

(86) PCT No.: PCT/EP2022/052764
§ 371 (c)(1),
(2) Date: Jul. 31, 2023

(87) PCT Pub. No.: WO2022/167609
PCT Pub. Date: Aug. 11, 2022

(65) Prior Publication Data
US 2024/0092574 A1    Mar. 21, 2024

(30) Foreign Application Priority Data
Feb. 8, 2021 (NO) .................................. 20210162

(51) Int. Cl.
*B65G 1/04* (2006.01)
*B65G 1/137* (2006.01)

(52) U.S. Cl.
CPC ......... *B65G 1/0478* (2013.01); *B65G 1/0464* (2013.01); *B65G 1/137* (2013.01); *B65G 2203/042* (2013.01); *B65G 2207/40* (2013.01)

(58) Field of Classification Search
CPC .... B65G 1/0478; B65G 1/0464; B65G 1/137; B65G 2203/042; B65G 2207/40
See application file for complete search history.

(56) References Cited

U.S. PATENT DOCUMENTS 10,289,117 B1    5/2019    Zou et al.
11,866,253 B2*   1/2024    Herman ............... B65G 1/0478
(Continued)

FOREIGN PATENT DOCUMENTS

CN    205397174 U    7/2016
CN    206456936 U    9/2017
(Continued)

OTHER PUBLICATIONS

Anh, Le Huy, Office Action in VN1152305980, mailed May 29, 2025, 4 pages, Intellectual Property Office of Vietnam, Hanoi, Vietnam.
(Continued)

*Primary Examiner* — Saul Rodriguez
*Assistant Examiner* — Ashley K Romano
(74) *Attorney, Agent, or Firm* — Baker Botts L.L.P.

(57) ABSTRACT

A method of measuring level deviation in an automated storage and retrieval system, wherein the system includes rail system, at least one container handling vehicle, and a central control unit. The rail system includes a first set of parallel rails arranged to guide movement of a container handling vehicle in a first direction across the top of a frame structure, and a second set of parallel rails arranged perpendicular to the first set of rails to guide movement of the container handling vehicle in a second direction which is perpendicular to the first direction. The first and second sets of parallel rails divide the rail system into a plurality of grid cells. The at least one container handling vehicle is config-
(Continued)

ured to operate on the rail system. The at least one container handling vehicle is provided with at least one orientation sensor configured to measure at least one orientation parameter of the sensor in a three-dimensional cartesian reference system. The central control unit is configured to receive, transmit, and process data signals of the container handling vehicle and to receive and process data signals of the sensor. The method includes arranging the container handling vehicle in a predetermined position on the grid, transmitting a data signal from the central control unit to the container handling vehicle commanding the container handling vehicle to move a distance in one direction along the grid, and measuring at predetermined intervals, using the orientation sensor, at least one orientation parameter to produce orientation measurements that are indicative of the container handling vehicle's orientation within the three-dimensional cartesian reference system. The method further includes transmitting data concerning the orientation measurements to the central control unit, and processing the orientation measurements using the central control unit in order to identify portions of the rail system that deviate from predetermined values.

16 Claims, 7 Drawing Sheets

(56) References Cited

U.S. PATENT DOCUMENTS

| | | | | |
|---|---|---|---|---|
| 12,005,478 | B2* | 6/2024 | Bell | B07C 3/006 |
| 12,006,148 | B2* | 6/2024 | Cavelius | B65G 1/0485 |
| 12,110,184 | B2* | 10/2024 | Becker | B65G 57/302 |
| 12,129,120 | B2* | 10/2024 | Langenbach | B65G 57/22 |
| 12,286,298 | B2* | 4/2025 | Minematsu | B65G 1/0492 |
| 12,398,010 | B2* | 8/2025 | Yamamoto | B65H 31/18 |
| 12,404,100 | B2* | 9/2025 | Parks | B65G 1/0464 |
| 2019/0375590 | A1 | 12/2019 | Gravelle et al. | |
| 2021/0002079 | A1 | 1/2021 | Mäder | |
| 2022/0177223 | A1* | 6/2022 | Heggebø | B65G 1/0464 |
| 2023/0142017 | A1* | 5/2023 | Wang | B25J 9/1687 414/352 |
| 2023/0142253 | A1* | 5/2023 | Heggebø | B65G 1/0464 700/218 |
| 2023/0263107 | A1* | 8/2023 | Stadie | A01G 9/247 47/17 |

FOREIGN PATENT DOCUMENTS

| | | |
|---|---|---|
| CN | 207726108 U | 8/2018 |
| CN | 210 654 777 U | 6/2020 |
| CN | 112 326 019 A | 2/2021 |
| DE | 102019107496 A1 | 10/2020 |
| JP | 2009-137724 A | 6/2009 |
| NO | 317366 B1 | 10/2004 |
| WO | 2014/075937 A1 | 5/2014 |
| WO | 2014/090684 A1 | 6/2014 |
| WO | 2015/193278 A1 | 12/2015 |
| WO | 2021/008766 A1 | 1/2021 |

OTHER PUBLICATIONS

Waldstein, Martin, International Preliminary Report on Patentability in PCT/EP2022/052764, mailed May 17, 2022, 9 pages, European Patent Office, Rijswijk, Netherlands.
Pattama Petchmanee, Notice for Amendment in Thai Patent Application No. 2301004837 mailed Jun. 21, 2024, 7 pages (including translation), Thai Patent Office, Department of Intellectual Property, Amphur Muang Nonthaburi, Thailand.
International Search Report issued in corresponding International Application No. PCT/EP2022/052764, mailed on May 17, 2022 (5 pages).
Written Opinion issued in corresponding International Application No. PCT/EP2022/052764, mailed on May 17, 2022 (11 pages).
Norwegian Search Report issued in counterpart Norwegian Application No. 20210162 mailed on Sep. 6, 2021 (2 pages).
Wen, Hui, Office Action in CN2022800138122, mailed Sep. 10, 2025, 11 pages, The State Intellectual Property Office of the People's Republic of China, Beijing, China.

* cited by examiner

GRID SURVEY MODULE

FIELD OF THE INVENTION

The present invention relates to an automated storage and retrieval system for storage and retrieval of containers, in particular to a method for measuring level deviation in the columns of the grid.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises a number of upright members 102 and a number of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 201,301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. In this way, the rail system 108 defines grid columns 112 above which the container handling vehicles 201,301 can move laterally above the storage columns 105, i.e. in a plane which is parallel to the horizontal X-Y plane.

A control system 500 of the automated storage and retrieval system 1 is shown in communication with the vehicles 200, 300.

Each prior art container handling vehicle 201,301 comprises a vehicle body 201a,301a, and first and second sets of wheels 201b, 301b, 201c, 301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. Each set of wheels 201b, 301b 201c, 301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid disclosed in FIG. 1, Z=8 identifies the lowermost, bottom layer of the grid 104. Similarly, X=1 . . . n and Y=1 . . . n identifies the position of each grid column 112 in the horizontal plane. Consequently, as an example, and using the Cartesian coordinate system X, Y, Z indicated in FIG. 1, the storage container identified as 106' in FIG. 1 can be said to occupy grid location or cell X=10, Y=2, Z=3. The container handling vehicles 201,301 can be said to travel in layer Z=0, and each grid column 112 can be identified by its X and Y coordinates.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicles 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a grid column 112, e.g. as is disclosed in WO2014/090684A1.

The rail system 108 may be a single-track rail system, as is shown in FIG. 4. Alternatively, the rail system 108 may be a double-track rail system, as is shown in FIG. 5, thus allowing a container handling vehicle 201 having a footprint generally corresponding to the lateral area defined by a grid column 112 to travel along a row of grid columns even if another container handling vehicle 201 is positioned above a grid column neighboring that row. Both the single and double-track rail systems, or a combination comprising a single and double-track rail arrangement in a rail system 108, form a grid pattern in the horizontal plane P comprising a plurality of rectangular and uniform grid locations or grid cells 122, where each grid cell 122 comprises a grid opening 115 being delimited by a pair of tracks 110a,110b of the first tracks 110 and a pair of tracks 111a,111b of the second set of tracks 111. In FIG. 5 the grid cell 122 is indicated by a dashed box.

Consequently, tracks 110a and 110b form pairs of tracks defining parallel rows of grid cells running in the X direction, and tracks 111a and 111b form pairs of tracks defining parallel rows of grid cells running in the Y direction.

As shown in FIG. 6, each grid cell 122 has a width Wc which is typically within the interval of 30 to 150 cm, and a length Lc which is typically within the interval of 50 to 200 cm. Each grid opening 115 has a width Wo and a length Lo which is typically 2 to 10 cm less than the width Wc and the length Lc of the grid cell 122.

In the X and Y directions, neighboring grid cells are arranged in contact with each other such that there is no space there-between.

In a storage grid 104, a majority of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201,301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119,120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119,120 for further transportation to an access station. Note that the term 'tilted' means transportation of storage containers 106 having a general transportation orientation somewhere between horizontal and vertical.

The grid 104 in FIG. 1 comprises two port columns 119 and 120. The first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported to the grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 119,120 and the access station.

If the ports 119,120 and the access station are located at different levels, the conveyor system may comprise a lift device with a vertical component for transporting the storage containers 106 vertically between the port 119,120 and the access station.

The conveyor system may be arranged to transfer storage containers 106 between different grids, e.g. as is described in WO2014/075937A1, the contents of which are incorporated herein by reference.

When a storage container 106 stored in the grid 104 disclosed in FIG. 1 is to be accessed, one of the container handling vehicles 201,301 is instructed to retrieve the target storage container 106 from its position in the grid 104 and transport it to the drop-off port 119.

This operation involves moving the container handling vehicle 201,301 to a grid location above the storage column 105 in which the target storage container 106 is positioned, retrieving the storage container 106 from the storage column 105 using the container handling vehicle's 201,301 lifting device (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 201,301 is instructed to pick up the storage container 106 from the pick-up port 120 and transport it to a grid location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system which typically is computerized and which typically comprises a database for keeping track of the storage containers 106.

It is important that the grid the container handling vehicles are operating on is level and in good conditions for the system to function properly. It is therefore key when building a grid, that the floor is strong enough to hold the weight and that it is level in order to ensure that the container handling vehicles can travel safely and operate properly on the grid.

A grid can sometimes develop faults that are severe enough to influence the operation of the container handling robots. Usually a fault will develop slowly over time so there is a need for regular surveillance of the state of the grid. If unchecked, such a fault could be of such a nature that it can halt or even damage a container handling vehicle resulting in the grid closing for repairs.

Another problem with a grid that has faults in the form of height differences between the cells of the grid and even the different vertical members of the grid is that it can lead to wear and tear on the different parts of the storage system. Containers can be destroyed by scraping against the sides of the columns, the columns can be destroyed due to the scraping of the containers. Further the lifting platform of the container handling vehicles can be destroyed if they hit the vertical members of a column during raising and lowering of container in and out of the grid. Also, the container handling vehicles can suffer damage due to an uneven grid. The wheels and the motors supplying power to the wheels can be damaged if e.g. a wheels is not in contact with the grid during transportation.

SUMMARY OF THE INVENTION

The present invention is set forth and characterized in the independent claims, while the dependent claims describe other characteristics of the invention.

In one aspect, the invention is related to a method of measuring level deviation in an automated storage and retrieval system, wherein the system comprises:
a rail system comprising a first set of parallel rails arranged to guide movement of a container handling vehicle in a first direction (X) across the top of a frame structure, and a second set of parallel rails arranged perpendicular to the first set of rails to guide movement of the container handling vehicle in a second direction (Y) which is perpendicular to the first direction (X), the first and second sets of parallel rails dividing the rail system into a plurality of grid cells, at least one container handling vehicle configured to operate on the rail system, wherein the at least one container handling vehicle is provided with at least one orientation sensor configured to measure at least one orientation parameter of the sensor in a three-dimensional cartesian reference system, a central control unit configured to receive, transmit and process data signals of the container handling vehicle and to receive and process data signals of the sensor, wherein the method comprises the steps of: arranging the container handling vehicle in a predetermined position on the grid, transmitting a data signal from the central control unit to the container handling vehicle commanding the container handling vehicle to move a distance in one direction (X, Y) along the grid, measuring at predetermined intervals, using the orientation sensor, at least one orientation parameter to produce orientation measurements that are indicative of the container handling vehicle's orientation within the three-dimensional cartesian reference system, transmitting data concerning the orientation measurements to the central control unit, and processing the orientation measurements using the central control unit in order to identify portions of the rail system that deviate from predetermined values.

Further measuring the orientation parameter is performed using an orientation sensor in the form of an inclination sensor for measuring the inclination of the container handling robot relative to Earth's gravity in each of the X- and Y-directions.

Measuring the pitch ($\varphi$) and the roll ($\Theta$) of the container handling vehicle in each column of the grid.

Measuring the pitch ($\varphi$) and the roll ($\Theta$) of the container handling vehicle in each column of the grid using an inertial measurement unit (IMU) fixed to the container handling vehicle.

Including a step of calculating a height difference, $\Delta Hx$ and $\Delta Hy$ between an average height of each side of individual grid cells.

Calculating a magnitude of skewness of an individual grid cell from the orientation measurements using formula $$\text{magnitude} = \sqrt{|\Delta H_x|^2 + |\Delta H_y|^2}$$

Calculating a magnitude of skewness of an individual grid cell from the orientation measurements using formula $$\text{magnitude} = |\Delta H_x| + |\Delta H_y|$$

Generating a map using the magnitudes of the skewness of individual grid cells.

Plotting a level of deviation of each grid cell in a map and outputting the map.

Using different colours for indicating the severity of level deviation in a grid cell.

Using a container handling vehicle to measure at predetermined intervals wherein the predetermined intervals are each grid cell of the rail system one-by-one.

A plurality of said container handling vehicles operating on the rail system, each provided with the at least one orientation sensor, the plurality of container handling vehicles each transmitting orientation measurements to the central control unit to allow level deviation of grid cells in different regions of the rail system to be determined simultaneously while the container handling vehicles are handling containers of the automated storage and retrieval system.

Using container handling vehicles to measure a deviation in the rail system while doing normal operations.

Maintaining a level rail system in an automated storage and retrieval system comprising employing a method of measuring level deviation in the automated storage and retrieval system according to any preceding claim, the method of maintaining including adjusting the upright members of the columns using the measurements.

In a second aspect the invention is related to a system of measuring level deviation in an automated storage and retrieval system, wherein the system comprises: a rail system comprising a first set of parallel rails arranged to guide movement of a container handling vehicle in a first direction (X) across the top of a frame structure, and a second set of parallel rails arranged perpendicular to the first set of rails to guide movement of the container handling vehicle in a second direction (Y) which is perpendicular to the first direction (X), the first and second sets of parallel rails dividing the rail system into a plurality of grid cells, at least one container handling vehicle configured to operate on the rail system, wherein the at least one container handling vehicle is provided with at least one orientation sensor configured to measure at least one orientation parameter of the sensor in a three-dimensional cartesian reference system, a central control unit configured to receive, transmit and process data signals of the container handling vehicle and to receive and process data signals of the sensor, wherein the container handling vehicle arranged in a predetermined position on the grid, a central control unit for transmitting a data signal to the container handling vehicle commanding it to move along the grid, an orientation sensor for measuring at least one orientation parameter at predetermined intervals and transmitting data concerning the orientation measurements to the central control unit, and processing the orientation measurements using the central control unit in order to identify portions of the rail system that deviate from predetermined values.

In a third aspect, the invention is related to a map displaying the level of deviation of each grid cell in an automated storage and retrieval system.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
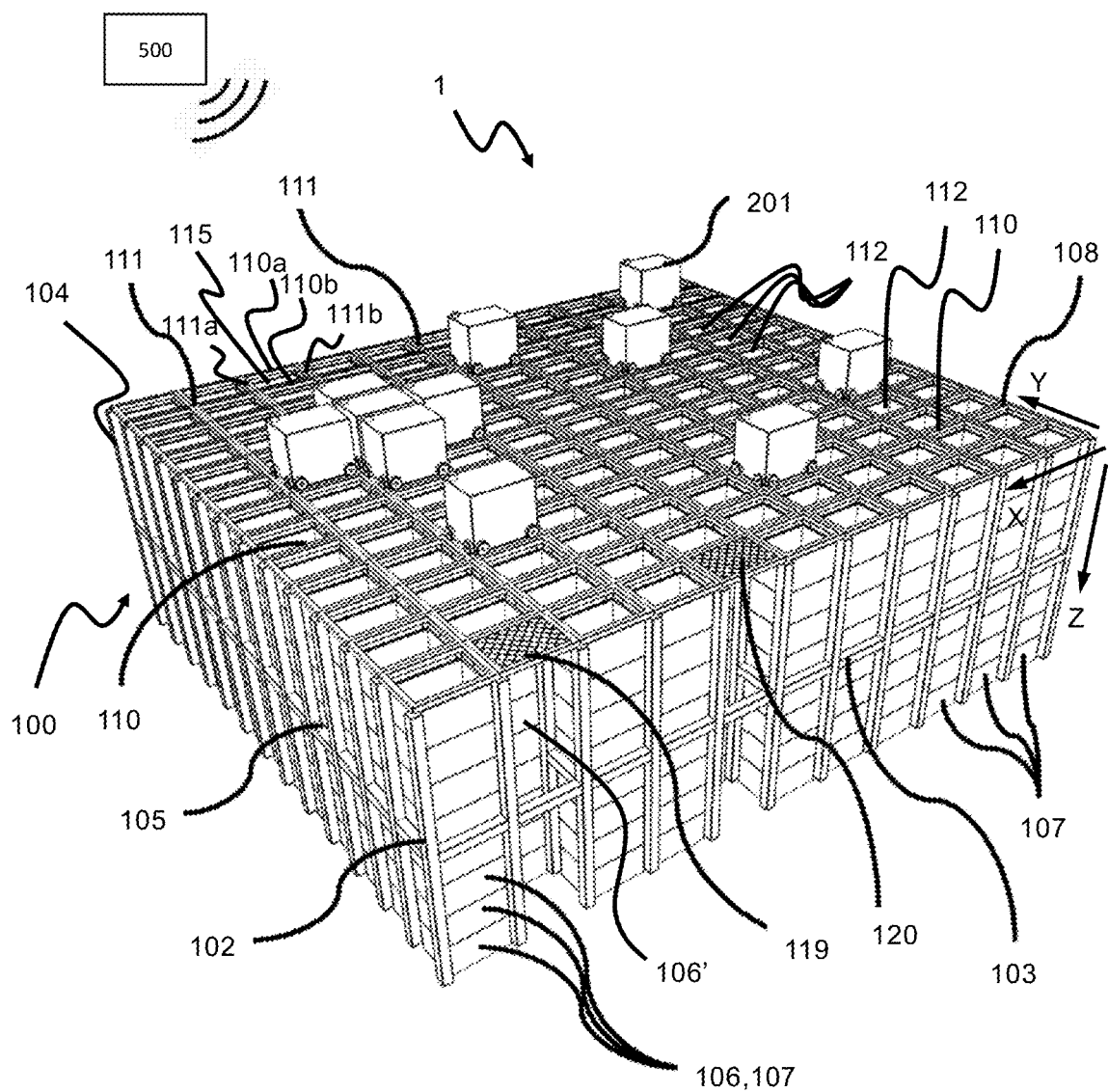
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Although we in this description describes the use of wheels it is to be understood that other types of driving means can also be used. An example of this is e.g. caterpillar tracks or any form of continuous track.

Figure 2:
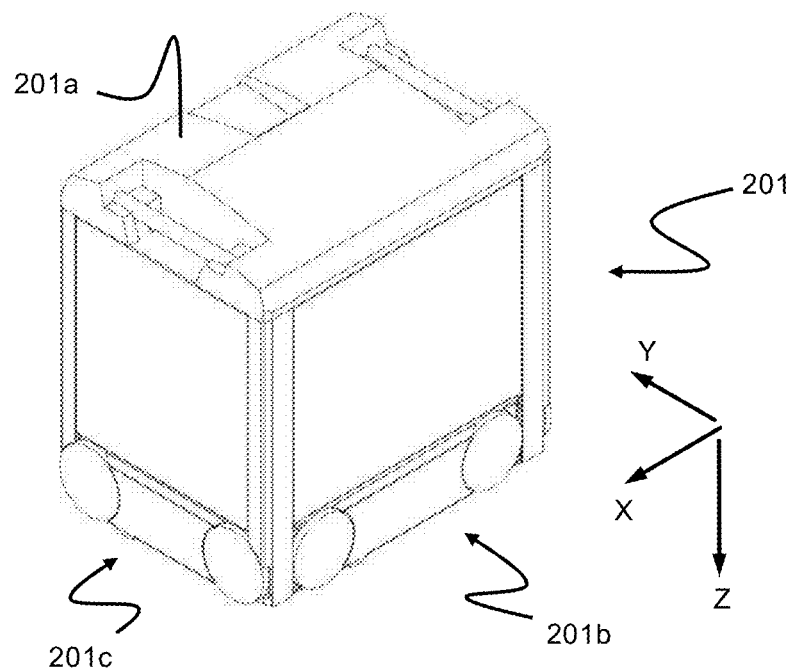
FIG. 2 is a perspective view of a prior art container handling vehicle having a centrally arranged cavity for carrying storage containers therein.
Figure 3:
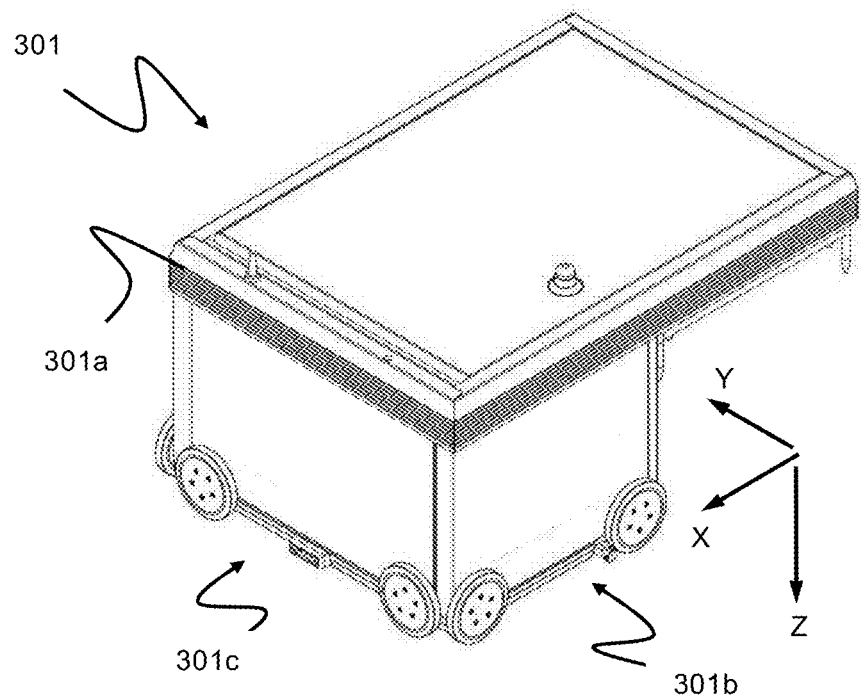
FIG. 3 is a perspective view of a prior art container handling vehicle having a cantilever for carrying storage containers underneath.
Figure 4:
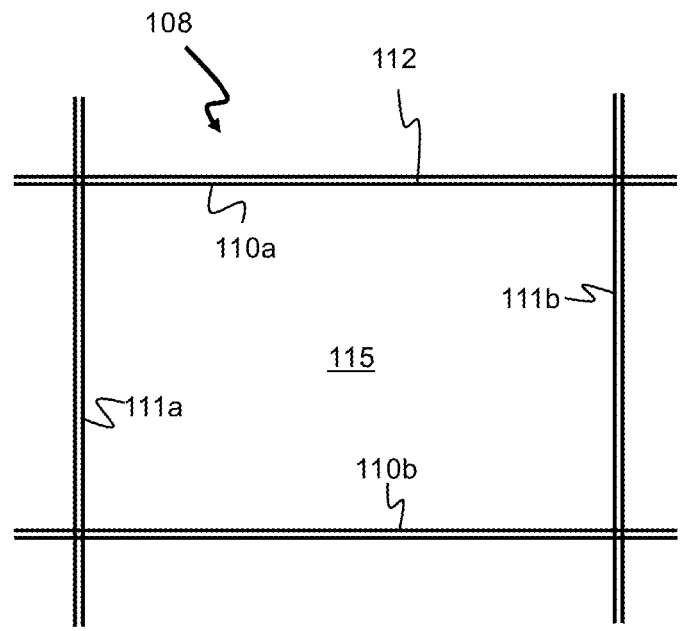
FIG. 4 a top view of a grid cell of a rail system showing a single-track rail system in the X-direction and in the Y direction.
Figure 5:
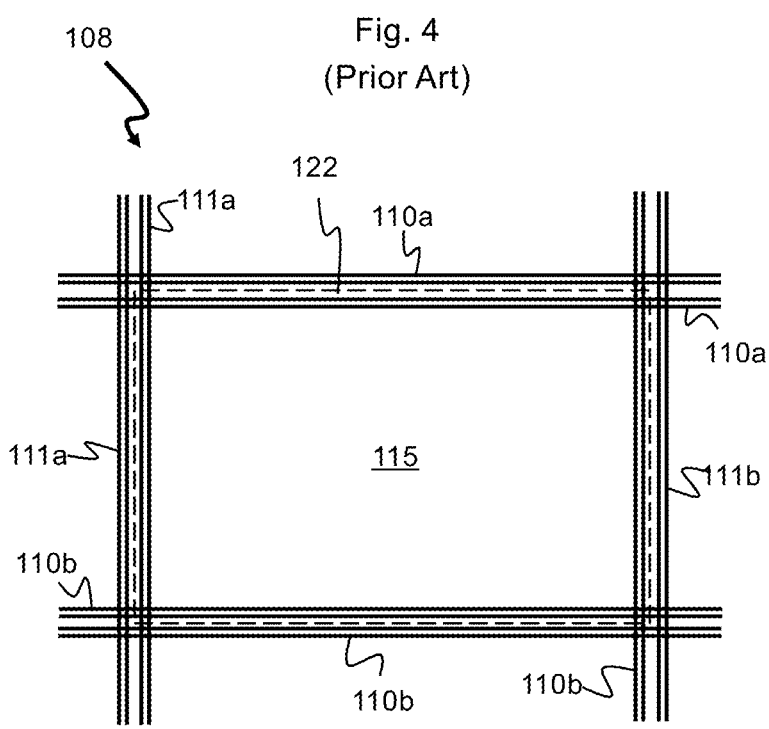
FIG. 5 is a top view of a grid cell of a rail system showing rails with two tracks in the X-direction and rails with two tracks in the Y direction.
Figure 6:
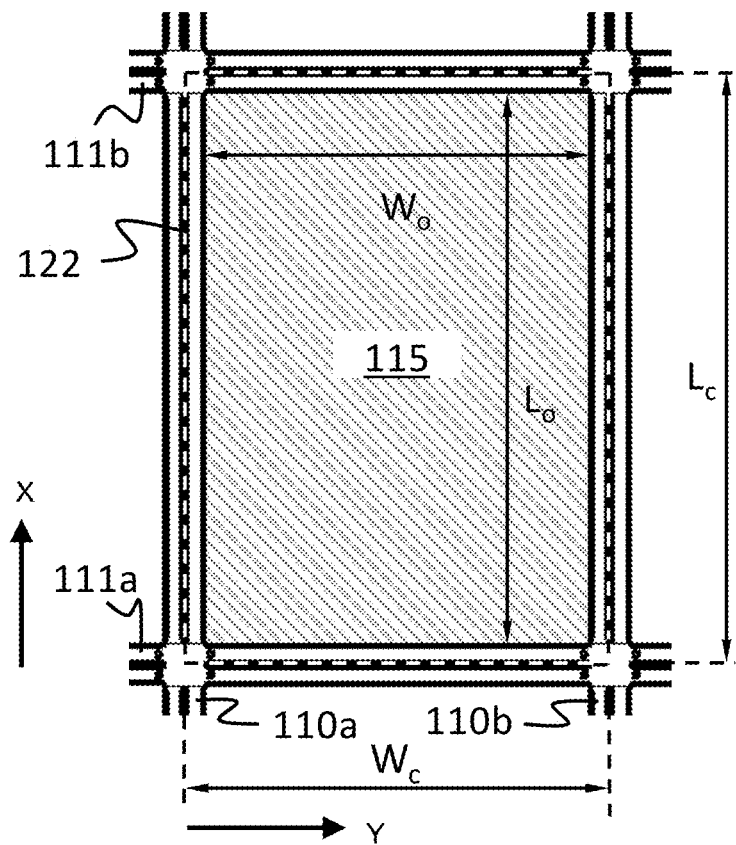
FIG. 6 is a top view of a grid cell in more detail.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the method of measuring level deviation in an automated storage and retrieval system according to the invention will now be discussed in more detail with reference to FIGS. 7 to 10.

In the preceding description, various aspects of the container handling vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

Figure 7:
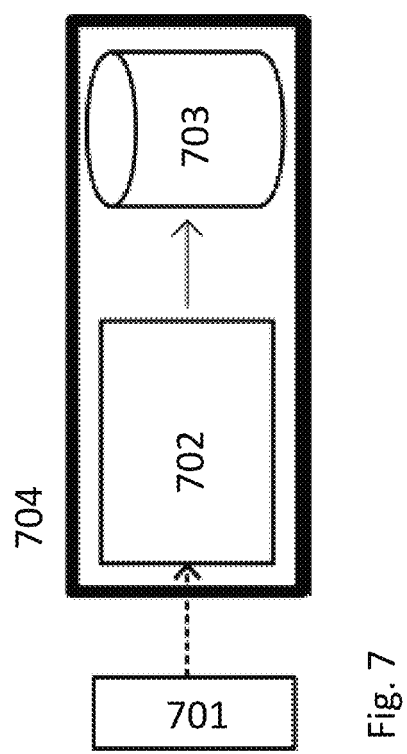
FIG. 7 is a schematic drawing of an embodiment of a system that logs the orientation measurements.

FIG. 7 is a schematic drawing of a system that logs the orientation measurements. The drawing shows the one or more sensors 701 and the flow of data from the sensors to the logging equipment. The logger 702 reads the data and timestamps it, and then records it in the log 703. The logger 702 and the log 703 can be on a remote computer 704.

The logger 702 performs the operation for every stop the container handling vehicle performs during a measurement run. In a preferred embodiment of the present invention a container handling vehicle moves from column to column on the grid and performs measurements. For each column the sensor performs the necessary measurements. The logger can be positioned on the container handling vehicle. Alternatively, the logger can be located on the central computer system.

The measurements are performed using a sensor for measuring the incline of a grid cell, and hence the underlying storage column, in relation to gravity. The incline of a grid cell can be affected by movement of the upright members that define the positions of the corners of a grid cell. The upright members can shift, they can distort due to thermal and load cycling, the ground can shift or have settling problems, etc. These are all possible reasons why the top of a grid cell in an automated storage and retrieval system can become uneven over time. At least one sensor on a container handling vehicle can be used in order to measure if, and by how much, the rails on top of the storage columns deviate from a horizontal level. The measurements can be done by at least one container handling vehicle while it travels along the rails over the grid spaces, from one storage column to the next storage column, handling containers that are being retrieved and returned for storage in the automated storage and retrieval system. Alternatively, the measurements can be produced by at least one container handling vehicle performing survey operations rather than its ordinary container handling missions. The measurements can be done in such a way that the entire grid of the rail system is first scanned grid cell by grid cell by one or more of the container handling vehicles and the data is thereafter updated by container handling vehicles repeating the paths while performing their regular duties. In this way it is possible to continually update the information about the state of the grid spaces of the rail system.

When a problem is identified with a part of the rail system, wherein the inclination of one or more of the grid cells is/are so severe that there is danger of a container handling vehicle traveling over that part of the grid and having an accident in the form of a derailing or similar, or could experience a problem with raising and lowering storage containers in the storage columns, the problem can be remedied by adjusting the height of the upright members in that part of the grid or making some other modification so that a plane created by the rails on top of the grid is as close to horizontal as possible.

In a preferred embodiment of the present invention the sensor 701 can be an Inertial Measurement Unit (hereafter called IMU). An inertial measurement unit (IMU) is an electronic device that measures and reports a body's specific force, angular rate, and sometimes the orientation of the body, using a combination of accelerometers, gyroscopes, and sometimes magnetometers. A benefit of using an IMU is that it is cheap which makes it possible to incorporate an IMU unit in all container handling vehicles. This would allow the container handling vehicles to continuously monitor the state of the grid cells and rail system.

In an additional embodiment of the present invention, one or more of the sensors can be a precise inclination sensor. The precise inclination sensor measures the inclination of each grid cell by measuring the pitch and roll of the container handling vehicle as it passes over or stands in that particular grid cell. The precise inclination sensor is very accurate, but it is also costly so it is not likely that a sensor would be installed in every container handling vehicle. This sensor may therefore not be practical for continued measurements of the state of the grid while the container handling vehicle performs its daily tasks but might be used at periodic intervals.

As an alternative to the sensors being permanently mounted on the one or more container handling vehicles, there are possibilities of the at least one sensor and the communication unit communicating the measurements to a grid survey unit, where the logging of the data and the calculations are performed, being located in a box or a unit that can be handled by the gripper unit of a container handling vehicle.

Figure 8:
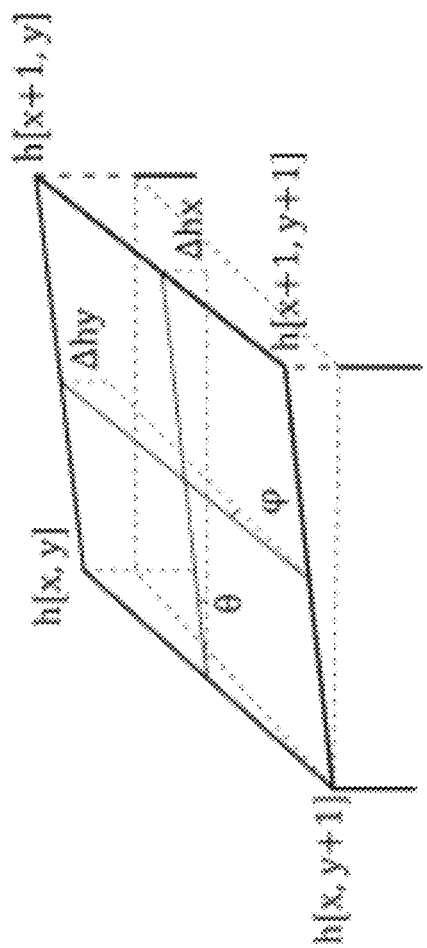
FIG. 8 is a perspective illustration of the orientation measurements representing an incline of a container handling vehicle positioned over a grid cell performed by a container handling vehicle without a pendulum.

FIG. 8 is a perspective illustration of the measurements of the incline of the container handling vehicle positioned over a grid space performed by a container handling vehicle without a pendulum.

A container handling vehicle has two wheels on each of the 4 sides of the container handling vehicle. Hence there are four wheels for transporting the container handling vehicle in the X-direction and 4 wheels for transporting the container handling vehicle in the Y-direction.

In a container handling vehicle without a pendulum, the set of wheels for transporting the container handling vehicle in the X-direction or in the Y-direction are always fixed in relation to each other. That is to say all the wheels in the same direction are either fixed to the body of the container handling vehicle or they are all lowered or raised the same distance.

With this solution, one cannot be certain that all the wheels in one direction are touching the rails at the same time. If the difference in heights between the upright members in a column is severe a container handling vehicle traveling along the storage system can become unstable and e.g. could potentially derail, which can lead to long shut-downs of the system to fix the problem.

When calculating the deviation of the grid cell, and hence the deviation of the heights of the upright members of the columns, first the length of the rails in both the X- and the Y (lengde X and lengde Y in formula III and IV) direction is taken into account, the lengths of the rails in each grid cell direction being previously known to the system. Thereafter the measurements of the incline of the container handling vehicle is performed. From these two sets of parameters it is possible to calculate the deviation of height between the different upright members in the specific height of each upright member.

This method simulates a robot, i.e., a container handling vehicle, without a pendulum and calculates the average angle in the cells. For each cell it is first calculated the height difference, $\Delta Hx$ and $\Delta Hy$ between the average height of each side of the cell as shown in formula I and II $$\Delta H_x = \frac{h[x+1, y] + h[x+1, y+1]}{2} - \frac{h[x, y] + h[x, y+1]}{2} \qquad \text{I}$$

$$\Delta H_y = \frac{h[x, y+1] + h[x+1, y+1]}{2} - \frac{h[x+1, y] + h[x, y]}{2} \qquad \text{II}$$

Then pitch and roll are calculated with respectively formula III and IV $$\theta = \arcsin\left(\frac{\Delta H_x}{lengdeX}\right) \qquad \text{III}$$

$$\varphi = \arcsin\left(\frac{\Delta H_y}{lengdeY}\right) \qquad \text{IV}$$

An overview of the variables is shown in FIG. 8 where pitch and roll are denoted as respectively φ and θ.

Figures 9, 10:
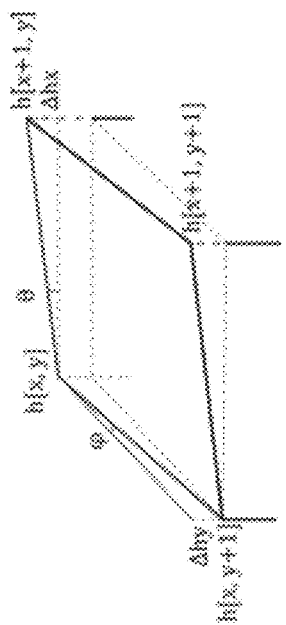
FIG. 9 is a perspective view of the orientation measurements representing an incline of the container handling vehicle positioned over a grid cell performed by a container handling vehicle with a pendulum.
FIG. 10 is an illustration of the rail system wherein level deviation (e.g., skewness) in the different grid cells are displayed in the form of a heat map.

FIG. 9 is a perspective view of the measurements of the incline of the container handling vehicle positioned over a column performed by a container handling vehicle with a pendulum.

A container handling vehicle with a pendulum is a vehicle where there is a ball bearing between two parallel wheel sections. The pendulum ensure that the container handling vehicle has all the wheels in one direction in contact with the tracks even though the tracks of a column does not have the same incline.

FIG. 9 discloses a way of calculating the height difference in each column using a container handling vehicle with a pendulum. A robot with a pendulum and calculate the angle directly on the rails. First the height difference between the upright members in the x- and y-direction is calculated, as shown in the formula V and VI $$\Delta H_x = h[x+1, y] - h[x, y] \qquad \text{V}$$

$$\Delta H_y = h[x, y+1] - h[x, y] \qquad \text{VI}$$

Thereafter pitch and roll are calculated by using formula III and IV.

An overview of the variables is shown in FIG. 9 where pitch and roll are denoted as respectively φ and Θ.

For both a container handling vehicle without a pendulum (FIG. 8) and a container handling vehicle with a pendulum (FIG. 9) it is necessary to have a way of emphasizing the level of skewness in each grid cell, since a heat map (i.e., a map of the skewness) only has one value per cell while there is a total of two angles and two delta heights. There are several ways of converting these two values to a single value for a heat map.

The absolute value of the height difference in a cell is calculated by formula VII and VIII.

$$|\Delta H_x| = |lengdeX \cdot \sin(\theta)| \qquad \text{VII}$$

$$|\Delta H_y| = |lengdeY \cdot \sin(\varphi)| \qquad \text{VIII}$$

In a preferred embodiment of the present invention, the magnitude of the skewness of a single cell is calculated using formula IX.

$$\text{magnitude} = \sqrt{|\Delta H_x|^2 + |\Delta H_y|^2} \qquad \text{IX:}$$

In an alternative embodiment of the present invention formula X can be used to calculate the magnitude of the skewness of a single grid cell.

$$\text{magnitude} = |\Delta H_x| + |\Delta H_y| \qquad \text{X:}$$

FIG. 10 is an illustration of a grid-based rail system wherein the difference in height in the different columns are displayed. Here it can be seen that the difference in height of the columns are displayed in a heat map. The heat map gives an indication of where the anomalies in the rail system detected by the container handling vehicles are, and how severe the anomalies are. The severity of the anomalies is indicated by a colour. Alternatively, it can be displayed by a shade of grey or intensity of a line. The colour, the shade of grey or intensity of line (or other form of graphical representation) indicated in a grid cell can represent whether an action to remedy the anomaly is needed or not. It can also indicate if it is needed immediate action or if operation of the grid can be maintained with e.g. reduced speed.

Figure 11:
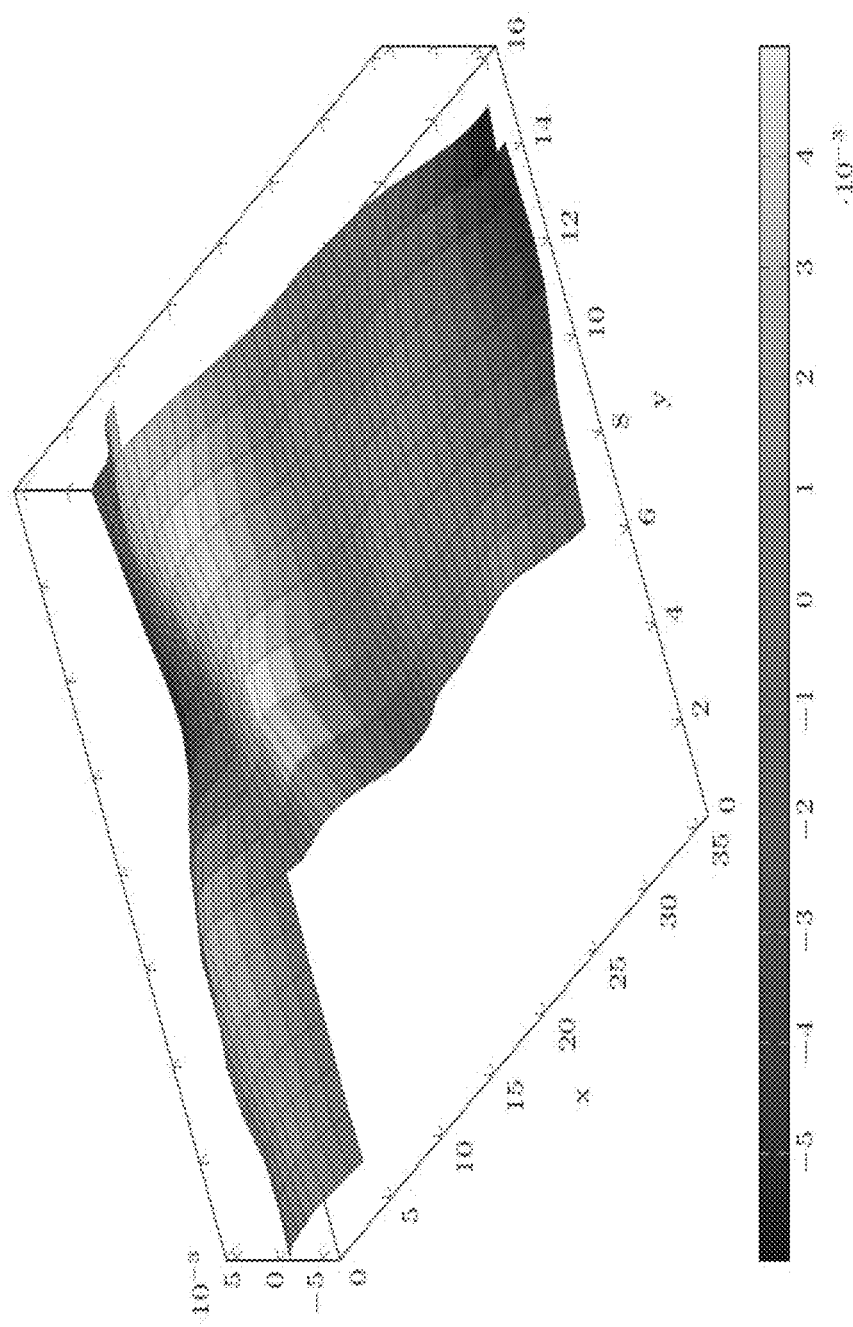
FIG. 11 is an illustration of the rail system wherein difference in height in the different grid cells are displayed in the form of a topographical map.

FIG. 11 is an illustration of the rail system wherein difference in height in the different grid cells are displayed in the form of a topographical map. The topographical map is a 3D-display of the height differences in the grid. The map can display the differences in height of each vertical member of the grid and the difference in height is relative to a theoretical flat grid.

With this solution it is also possible to keep track of the development of the anomalies over time. If an area of the grid develops increasing anomalies over time it can be an indication of subsidence damage. If there is a sudden appearance of an anomaly it can be an indication of a problem with one or more of the upright members in the columns. This can indicate an impact damage which has bent one or more of the upright members or it can be an indication of e.g. damage due to fatigue or movement due to thermal or load cycling. By studying the maps and the measurement history it is possible to give an indication of the type of damage and what kind of measures that need to be done and how fast it needs to be done.

The measurements can be done regularly by one or more container handling vehicles that has the sensors attached to it and performs a measurement regularly while the grid is not operational. Alternatively, one or more of the container handling vehicles operating normally on the grid can be fitted with the sensors and they can perform the measurements while they do their normal tasks on the grid-based rail system.

The gathered data can be used internally by the owners of the automated storage and retrieval system or it can be shared to a global database where the gathered data can be used to give an indication of what type problems that may occur and how to best remedy them. If there is a settling problem with a rail system, knowledge from this can be acquired about how to avoid this type of damage in the future and information about how to fix the problem can be stored in the database. If there is a problem with fatigue damage or fracture in the equipment it is useful information to gather in order to indicate who is the best suited to fix the problem and, the manufacturer of the equipment or if there is a problem with the design of the different parts of the storage grid.

An alternative way of measuring the angles of the cells in the storage system is using a container handling vehicle with a suspension system on the wheels, e.g. like the pendulum solution. This solution can measure the difference in height between the wheels and calculate the angle that difference makes relative to a horizontal line.

The mention of a pendulum solution on the container handling vehicles can be exchanged with a suspension system. Any type of suspension system can be used.

If there is detected an area of the grid that has an anomaly, this area can be compared to the weight from the containers in that area and the amount of weight from the container handling vehicles on the grid in that area. If the weight of the containers and the container handling vehicles in that area are coherent with an uneven grid, that part of the grid can be set under limited use by e.g. commanding the container handling vehicles to get items similar to the ones stored in the containers in the effected area from containers stored in another part of the grid. There is further possible to limit the amount of container handling vehicles that operate on the effected part of the grid. Also, it is possible to restrict the movement of the container handling vehicles in that area. It is possible to tell the container handling vehicles to not change direction in the affected area and to e.g. drive with reduced speed and a slower acceleration and deceleration.

LIST OF REFERENCE NUMBERS

Prior Art (FIGS. 1-6)

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
115 Grid opening
119 First port column
120 Second port column
122 Grid cell
201 Prior art container handling vehicle
201a Vehicle body of the container handling vehicle 201
201b Drive means/wheel arrangement, first direction (X)
201c Drive means/wheel arrangement, second direction (Y)
301 Prior art cantilever container handling vehicle
301a Vehicle body of the container handling vehicle 301
301b Drive means in first direction (X)

301c Drive means in second direction (Y)
304 Gripping device
500 Control system
701 Sensor
702 Logger
703 Log
704 Remote computer
X First direction
Y Second direction
Z Third direction

The invention claimed is:

1. A method of measuring level deviation in an automated storage and retrieval system, wherein the system comprises:
   a rail system comprising a first set of parallel rails arranged to guide movement of a container handling vehicle in a first direction (X) across the top of a frame structure, and a second set of parallel rails arranged perpendicular to the first set of rails to guide movement of the container handling vehicle in a second direction (Y) which is perpendicular to the first direction (X), the first and second sets of parallel rails dividing the rail system into a plurality of grid cells,
   at least one container handling vehicle configured to operate on the rail system, wherein the at least one container handling vehicle is provided with at least one orientation sensor configured to measure at least one orientation parameter of the sensor in a three-dimensional cartesian reference system,
   a central control unit configured to receive, transmit and process data signals of the container handling vehicle and to receive and process data signals of the sensor,
   wherein the method comprises:
   arranging the container handling vehicle in a predetermined position on the grid,
   transmitting a data signal from the central control unit to the container handling vehicle commanding the container handling vehicle to move a distance in one direction along the grid,
   measuring at predetermined intervals, using the orientation sensor, at least one orientation parameter to produce orientation measurements that are indicative of the container handling vehicle's orientation within the three-dimensional cartesian reference system,
   transmitting data concerning the orientation measurements to the central control unit, and
   processing the orientation measurements using the central control unit in order to identify portions of the rail system that deviate from predetermined values.

2. The method according to claim 1, wherein measuring the orientation parameter is performed using an orientation sensor in the form of an inclination sensor for measuring the inclination of the container handling vehicle relative to Earth's gravity in each of the X- and Y-directions.

3. The method according to claim 1, comprising measuring the pitch ($\varphi$) and the roll ($\Theta$) of the container handling vehicle in each column of the grid.

4. The method according to claim 1, wherein measuring the pitch ($\varphi$) and the roll ($\Theta$) of the container handling vehicle in each column of the grid using an inertial measurement unit (IMU) fixed to the container handling vehicle.

5. The method according to claim 1 including a step of calculating a height difference, $\Delta Hx$ and $\Delta Hy$ between an average height of each side of individual grid cells.

6. The method according to claim 5, wherein a magnitude of skewness of an individual grid cell is calculated from the orientation measurements using formula magnitude= $\sqrt{|\Delta H_x|^2+|\Delta H_y|^2}$.

7. The method according to claim 6, comprising generating a map using the magnitudes of the skewness of individual grid cells.

8. The method according to claim 7, comprising plotting a level of deviation of each grid cell in a map and outputting the map.

9. The method according to claim 8, comprising using different colours for indicating the severity of level deviation in a grid cell.

10. The method according to claim 5, wherein a magnitude of skewness of an individual grid cell is calculated from the orientation measurements using formula magnitude=$|\Delta H_x|+|\Delta H_y|$.

11. The method according to claim 1, comprising using a container handling vehicle to measure at predetermined intervals wherein the predetermined intervals are each grid cell of the rail system one-by-one.

12. The method according to claim 11, wherein there are a plurality of said container handling vehicles operating on the rail system, each provided with the at least one orientation sensor, the plurality of container handling vehicles each transmitting orientation measurements to the central control unit to allow level deviation of grid cells in different regions of the rail system to be determined simultaneously while the container handling vehicles are handling containers of the automated storage and retrieval system.

13. The method according to claim 1, comprising using container handling vehicles to measure a deviation in the rail system while doing normal operations.

14. A method of maintaining a level rail system in an automated storage and retrieval system comprising employing a method of measuring level deviation in the automated storage and retrieval system, wherein the system comprises:
   a rail system comprising a first set of parallel rails arranged to guide movement of a container handling vehicle in a first direction (X) across the top of a frame structure, and a second set of parallel rails arranged perpendicular to the first set of rails to guide movement of the container handling vehicle in a second direction (Y) which is perpendicular to the first direction (X), the first and second sets of parallel rails dividing the rail system into a plurality of grid cells,
   at least one container handling vehicle configured to operate on the rail system, wherein the at least one container handling vehicle is provided with at least one orientation sensor configured to measure at least one orientation parameter of the sensor in a three-dimensional cartesian reference system,
   a central control unit configured to receive, transmit and process data signals of the container handling vehicle and to receive and process data signals of the sensor,
   wherein the method of measuring level deviation in the automated storage and retrieval system comprises:
   arranging the container handling vehicle in a predetermined position on the grid,
   transmitting a data signal from the central control unit to the container handling vehicle commanding the container handling vehicle to move a distance in one direction along the grid,
   measuring at predetermined intervals, using the orientation sensor, at least one orientation parameter to produce orientation measurements that are indicative of the container handling vehicle's orientation within the three-dimensional cartesian reference system, transmitting data concerning the orientation measurements to the central control unit, and processing the orientation measurements using the central control unit in order to identify portions of the rail system that deviate from predetermined values, the method of maintaining including adjusting upright members of columns using the measurements.

15. A system of measuring level deviation in an automated storage and retrieval system, wherein the system comprises: a rail system comprising a first set of parallel rails arranged to guide movement of a container handling vehicle in a first direction (X) across the top of a frame structure, and a second set of parallel rails arranged perpendicular to the first set of rails to guide movement of the container handling vehicle in a second direction (Y) which is perpendicular to the first direction (X), the first and second sets of parallel rails dividing the rail system into a plurality of grid cells, at least one container handling vehicle configured to operate on the rail system, wherein the at least one container handling vehicle is provided with at least one orientation sensor configured to measure at least one orientation parameter of the sensor in a three-dimensional cartesian reference system, a central control unit configured to receive, transmit and process data signals of the container handling vehicle and to receive and process data signals of the sensor, wherein the container handling vehicle arranged in a predetermined position on the grid, a central control unit for transmitting a data signal to the container handling vehicle commanding the container handling vehicle to move along the grid, an orientation sensor for measuring at least one orientation parameter at predetermined intervals and transmitting data concerning the orientation measurements to the central control unit, and processing the orientation measurements using the central control unit in order to identify portions of the rail system that deviate from predetermined values.

16. A map displaying the level of deviation of each grid cell in an automated storage and retrieval system generated by (1) a method of measuring level deviation in the automated storage and retrieval system, wherein the system comprises:
- a rail system comprising a first set of parallel rails arranged to guide movement of a container handling vehicle in a first direction (X) across the top of a frame structure, and a second set of parallel rails arranged perpendicular to the first set of rails to guide movement of the container handling vehicle in a second direction (Y) which is perpendicular to the first direction (X), the first and second sets of parallel rails dividing the rail system into a plurality of grid cells,
- at least one container handling vehicle configured to operate on the rail system, wherein the at least one container handling vehicle is provided with at least one orientation sensor configured to measure at least one orientation parameter of the sensor in a three-dimensional cartesian reference system, a central control unit configured to receive, transmit and process data signals of the container handling vehicle and to receive and process data signals of the sensor, wherein the method of measuring level deviation in the automated storage and retrieval system comprises:

arranging the container handling vehicle in a predetermined position on the grid, transmitting a data signal from the central control unit to the container handling vehicle commanding the container handling vehicle to move a distance in one direction along the grid, measuring at predetermined intervals, using the orientation sensor, at least one orientation parameter to produce orientation measurements that are indicative of the container handling vehicle's orientation within the three-dimensional cartesian reference system, transmitting data concerning the orientation measurements to the central control unit, and processing the orientation measurements using the central control unit in order to identify portions of the rail system that deviate from predetermined values, and (2) a system of measuring level deviation in an automated storage and retrieval system, wherein the system comprises: a rail system comprising a first set of parallel rails arranged to guide movement of a container handling vehicle in a first direction (X) across the top of a frame structure, and a second set of parallel rails arranged perpendicular to the first set of rails to guide movement of the container handling vehicle in a second direction (Y) which is perpendicular to the first direction (X), the first and second sets of parallel rails dividing the rail system into a plurality of grid cells, at least one container handling vehicle configured to operate on the rail system, wherein the at least one container handling vehicle is provided with at least one orientation sensor configured to measure at least one orientation parameter of the sensor in a three-dimensional cartesian reference system, a central control unit configured to receive, transmit and process data signals of the container handling vehicle and to receive and process data signals of the sensor, wherein the container handling vehicle arranged in a predetermined position on the grid, a central control unit for transmitting a data signal to the container handling vehicle commanding the container handling vehicle to move along the grid, an orientation sensor for measuring at least one orientation parameter at predetermined intervals and transmitting data concerning the orientation measurements to the central control unit, and processing the orientation measurements using the central control unit in order to identify portions of the rail system that deviate from predetermined values.

* * * * *